United States Patent
Ferenczi et al.

[11] Patent Number: 6,064,311
[45] Date of Patent: May 16, 2000

[54] PROCESS FOR GENERATING AT LEAST ONE WARNING SIGNAL RELATING TO THE LEVEL IN A PRODUCT STORAGE TANK AND DEVICE FOR IMPLEMENTING THE PROCESS

[75] Inventors: Laurent Ferenczi; Frédéric Barth, both of Paris, France; Véronique Dulphy-Vigor, Chicago, Ill.; Nicolas Viard, Buc, France

[73] Assignee: L'Air Liquide, Societe Anonyme pour l'Etude et l'Exploitation des Procedes Georges Claude, Paris Cedex, France

[21] Appl. No.: 09/103,503

[22] Filed: Jun. 24, 1998

[30] Foreign Application Priority Data

Jun. 26, 1997 [FR] France .................... 97 08031

[51] Int. Cl.[7] .................... G08B 21/00
[52] U.S. Cl. .................... 340/618; 340/606; 340/612; 340/614; 73/290 R; 73/302; 364/143; 364/144
[58] Field of Search .................... 340/605, 606, 340/612, 614, 618, 619–625; 73/290 R, 304 R, 304 C, 305, 307, 308, 311, 313, 302; 364/143, 144

[56] References Cited

U.S. PATENT DOCUMENTS

| | | |
|---|---|---|
| 4,908,746 | 3/1990 | Vaughn .................... 364/147 |
| 4,976,146 | 12/1990 | Senghaas et al. .................... 73/313 |
| 5,121,340 | 6/1992 | Campbell .................... 364/509 |
| 5,743,135 | 4/1998 | Sayka et al. .................... 73/293 |

FOREIGN PATENT DOCUMENTS

| | | |
|---|---|---|
| 39 28 679 | 3/1991 | Germany . |
| WO 94/02821 | 2/1994 | WIPO . |

*Primary Examiner*—Julie Lieu
*Attorney, Agent, or Firm*—Young & Thompson

[57] ABSTRACT

The process for generating at least one warning signal relating to the level in a tank (3) for storing a product (4) comprises the following steps:

the storage level of the product in the tank, together with the values of the product quantity consumed during predefined time intervals are determined, these values are placed in memory together with the associated measurement instants, at other successive instants the values placed in memory of the product quantity consumed are used to calculate a value of the estimated quantity of product which will be consumed in the future, this estimated value is subtracted from the last measurement value so as to obtain an estimated value of the storage level at a future instant, this estimated value of the storage level is compared with a preset threshold, and a warning signal is generated if the estimated value is less than the preset threshold.

23 Claims, 3 Drawing Sheets

PROCESS FOR GENERATING AT LEAST ONE WARNING SIGNAL RELATING TO THE LEVEL IN A PRODUCT STORAGE TANK AND DEVICE FOR IMPLEMENTING THE PROCESS

The invention relates to a process for generating at least one warning signal relating to the level in a tank for storing a product and to a device for implementing the process. More particularly, it lies in the field of the distribution of bulk products such as industrial gases, petrol, etc. which are stored in tanks or appropriate storage facilities, installed on industrial sites at customers' premises close to the installations which consume these products.

A supplier responsible for restocking a pool of storage tanks is confronted daily with the problem that he must restock each tank before the stock of product in the latter is exhausted while however reducing the overall cost of restocking the pool. These constraints lead him to have to optimize, each day, the journeys by his fleet of restocking vehicles and to maximize, if possible, the quantities of product delivered during each trip by his vehicles.

This optimization of the restocking poses a problem owing to the fact that the profile of consumption of the products for each site is a priori unknown and that the number of restocking vehicles is limited.

In order to remedy this problem, it is known regularly to visit the storage facilities on the sites and to trigger a product delivery at the very latest when the stock falls below a certain restocking threshold fixed in advance.

This solution is constraining and expensive since it requires regular human intervention on the part of the supplier since, out of concern for quality of service, the intervention of the customer is undesirable.

Furthermore, it only offers a guarantee of continuity of availability of the product on condition that the following points are fulfilled:

(1) The visits must be frequent enough such that between two visits the level does not fall in an unforecastable way below the preset threshold, which could give rise to a depletion of stock.

BACKGROUND OF THE INVENTION (2) The restocking threshold must be high enough to be able to comply with the delivery deadlines which are for example imposed by the fact that the supplier's vehicle fleet only allows a limited number of tanks to be restocked per day.

Additionally, tanks for storing products are known which are equipped with a sensor for measuring the level of the product contained in the tank and with an associated controller for transmitting a warning signal to a restocking centre of the supplier. This controller compares the level values output by the sensor with a preset threshold and transmits, should the measured value be less than the threshold, a warning signal to the restocking centre.

Although this solution solves the abovementioned point (1) by replacing human intervention by a sensor associated with a controller, it still requires a high warning threshold to be able to comply with the abovementioned delivery deadlines. Consequently, optimization of restocking is far from being guaranteed, given that the choice of a high warning threshold, necessary for leaving a safety margin, is prejudicial thereto, and that the forecast of the delivery requirements is inaccurate and difficult to obtain. Moreover, to avoid a depletion of stock at the customer's premises, the supplier is often led to install oversized storage tanks, thus increasing on the one hand the product distribution cost and on the other hand the dimensions of the tank at the customer.

It is also known to use forecasting software which utilizes the dates and the quantities delivered per storage facility which are entered manually into a database by the supplier on returning from the deliveries. As before, a restocking threshold is set. The program extrapolates the known consumption figures so as to calculate the date on which the product storage level is liable to drop below this threshold. This date serves to schedule the supplier's delivery rounds.

Given that the information is entered manually, this solution is unreliable since transcription errors or data entry omissions are easily made. Following such an error, the supplier forecasts deliveries either too early which turns out expensive for him since the quantity of product delivered per trip is small, or else too late, which may lead to a depletion of stock and have serious consequences for the customer.

Furthermore, this approach is based only on the product quantities consumed and involves no knowledge of the actual levels of the stockpiles. Given that the storage level is read off only on the occasions of deliveries, this approach does not make it possible to react to exceptional situations which arise for example when a customer decides to operate his plant during a weekend or when working additional exceptional hours. In this case, the software forecasts a lower consumption than the actual consumption and this may lead to a depletion of stock if there is no human intervention. Consequently, the delivery dates calculated by this software may lead the supplier into error in the scheduling of the rounds of his vehicles. In order, nevertheless, to be able to ensure continuity of supply, the restocking threshold must therefore not only take account of the delivery deadline but also of any variations in the product quantities consumed which cannot be taken into account by this approach.

Owing to this uncertainty, this approach is generally applied in a very conservative manner with high safety thresholds, which hinders optimization of restocking per vehicle trip, and may lead the supplier to install oversized tanks at the customer's premises.

Additionally, the log of consumption on the basis of which the forecasts for the entire pool of stockpiles are made is generally recorded in a centralized databank or centralized file. The system is therefore vulnerable to a loss of data.

The invention aims to alleviate these various drawbacks by proposing a process and a device for implementing the process, which make it possible to generate an early warning signal with the aid of which the supplier can more accurately forecast the date of restocking a tank with a view to optimizing the restocking of a pool of storage tanks.

To this end, the subject of the invention is a process for generating at least one warning signal relating to the level in a tank for storing a product with a view to the restocking of the tank, in which a, least one measurement sensor associated with the tank is used to determine, at successive instants $t_0, t_1 \ldots t_{i-1}, t_i$ respectively, the values $N_0, N_1 \ldots N_{i-1}, N_i$ of the level of storage of the product in the tank, together with the values of the quantity of product $\Delta N_1, \Delta N_2, \ldots \Delta N_{i-1}, \Delta N_i$ consumed during the time intervals defined by two successive instants $\Delta t_1 = t_1 - t_0, \Delta t_2 = t_2 - t_1, \ldots \Delta t_{i-1} = t_{i-1} - t_{i-2}, \Delta t_i = t_i - t_{i-1}$, characterized by the following steps:

the measured values $N_0, N_1, \ldots N_{i-1}, N_i$, together with $\Delta N_1, \Delta N_2, \ldots \Delta N_{i-1}, \Delta N_i$ and the associated measurement instants $t_0, t_1 \ldots t_{i-}, t_i$ are placed in memory, at successive instants $\tau_0, \tau_1 \ldots \tau_{j-1}, \tau_j$ which are spaced apart by time intervals $\Delta\tau_1 = \tau_1 - \tau_0, \Delta\tau_2 = \tau_2 - \tau_1, \ldots \Delta\tau_j = \tau_j - \tau_{j-1}$ respectively, the time intervals $\Delta\tau$ being predefined and their duration being greater than or equal to the time intervals $\Delta t_n$, n being any natural number lying between 0 and i, the values placed in memory of the product quantity consumed $\Delta N_n$ during the time intervals $\Delta t_n$ are used to calculate a value of the estimated quantity of product $C_k$ which will be consumed between the instant $\tau_j$ and the instant $\tau_{j+k}$, $\tau_{j+k}$ being the k-th instant following $\tau_j$ and spaced apart therefrom by the time interval $\delta \tau_k = \Delta \tau_{j+1} + \Delta \tau_{j+2} + \ldots + \Delta \tau_{j+k}$, this value $C_k$ is subtracted from the most recent measured value $N_i$ so as to obtain an estimated value $N_i - C_k$ of the storage level at the instant $\tau_{j+k}$, this estimated value $N_i - C_k$ of the storage level is compared with a preset threshold $\theta$, and a warning signal is generated if the estimated value $N_i - C_k$ is less than the preset threshold $\theta$.

The process according to the invention can moreover comprise one or more of the following characteristics:

the values of the product quantity $\Delta N_n$ consumed during the time interval $\Delta t_n$ are determined by subtracting the value $N_n$ of the storage level measured at the instant $t_n$ from the value $N_{n-1}$ of the storage level measured at the instant $t_{n-1}$, the value of the product quantity $\Delta N_n$ consumed during the time interval $\Delta t_n$ is determined by measuring by means of a second sensor the flow rate of product drawn off from the tank and by integrating this measured flow rate between the instants $t_{n-1}$ and $t_n$.

The subject of the invention is also a device for generating at least one warning signal making it possible to implement the process defined above, characterized in that it comprises means for measuring the storage level of the product, a central processing unit for utilizing the level read off by the measurement means, a memory linked to the central processing unit and intended for holding the measurement instants $t_n$ output by a clock, the storage levels of the product $N_n$ in the tank and the product quantities $N_n$ consumed during the time intervals $\Delta t_n$, means for placing in memory at least one storage level threshold $\theta$, means for comparing the value of the storage level $N_i - C_k$ at the future instant $\tau_{j+k}$ output by the central processing unit with the said threshold $\theta$, and means for generating a warning signal which are controlled by the comparison means.

The subject of the invention is also a tank for storing a product, characterized in that it comprises a device of the type defined above.

Other characteristics and advantages of the invention will emerge from the following description given by way of non-limiting example with regard to the appended drawings.

DETAILED DESCRIPTION OF THE INVENTION

Figure 1:
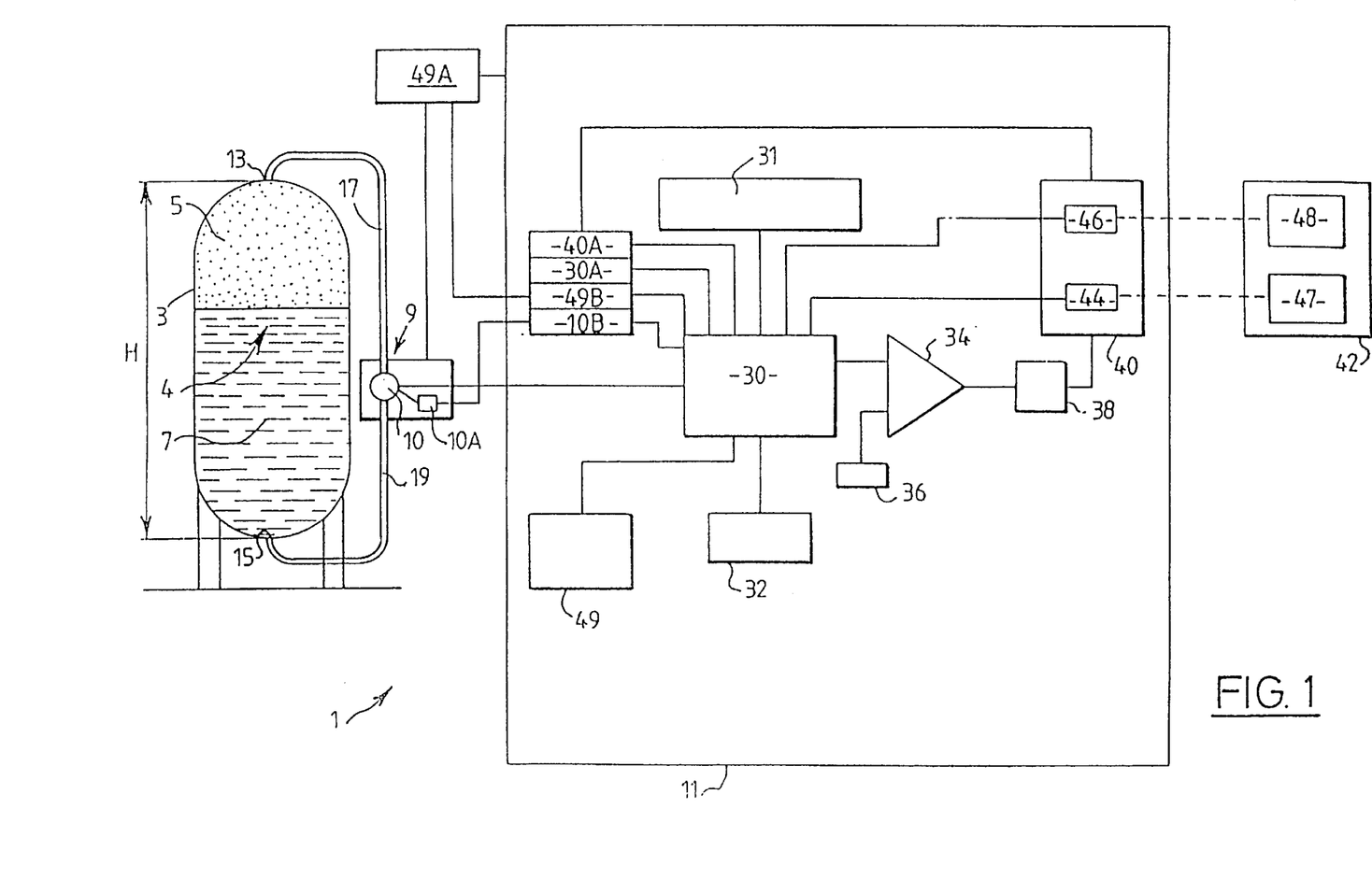
FIG. 1 is a schematic diagram of the device according to the invention installed on a tank for storing a liquefied gas.

Represented in FIG. 1 is a device 1 for generating a warning signal according to the invention. This device 1 is installed on a tank 3 containing, for example, a liquefied gas 4 exhibiting a vapour phase 5 and a liquid chase 7.

The device 1 comprises means 9 for measuring the storage level of the liquefied gas 4, and a processing unit 11 for processing the signals output by the measurement means 9.

The means 9 comprise a sensor 10 for measuring on the one hand the absolute pressure existing in the tank 3 and on the other hand the differential pressure between a high point 13 and a low point 15 of the tank 3. To this end, the sensor 10 is linked to these high 13 and low 15 points by a capillary 17, 19 respectively. Such a sensor requires regular calibration owing to the time-drifting of the "zero" reference. This is why the measurement means 9 are additionally equipped with a unit 10A for calibrating the sensor 10.

The unit 11 comprises a central processing unit 30 linked to the sensor 10 so as to utilize the signals output by the latter, a memory 31 linked to a central processing unit 30 and intended for holding the values which correspond to measurement instants output by a clock 32, product storage level values associated with these measurement instants as well as values which correspond to the product quantities consumed between two successive measurement instants.

Furthermore, the processing unit 11 comprises comparison means 34 one input of which is linked to the central processing unit 30 and another input of which is linked to memory means 36 for holding warning thresholds each corresponding to a predefined level of product storage.

An output of the comparison means 34 is linked to means 38 for generating a warning signal. Depending on the result of the comparison, the comparison means 34 send these means 38 a command to generate the warning signal.

The processing unit 11 furthermore comprise means for communication 40 of the device 1 with a restocking centre 42 which is remote from the tank 3, for example in another town. These communication means 40 comprise on the one hand means 44 for transmitting and on the other hand means 46 for receiving information respectively to or from the restocking centre 42 which cooperate with corresponding units 47 and 48 of the restocking centre.

The transmission means 44 are linked to an output of the means 38 for generating a warning signal so as to transmit, as a function of a command received by these means 38, the warning signal generated to the restocking centre 42. The receiving of such a warning signal by the centre 42 is equivalent to the receiving of a command for restocking the tank 3. Furthermore, the transmission means 44 are linked to the central processing unit 30 so as to transmit additional information calculated by this unit 30, such as a date before which there should be a product delivery and the estimated quantity of product which can be input into the tank 3 on the abovementioned date, to the restocking centre 42.

The receiving means 46 are linked to the central processing unit 30 so as to transmit to the latter information received from the restocking centre 42, especially information received in response to the recording by this centre of a restocking command, such as an acknowledgement of receipt and a forecast delivery deadline.

Advantageously, the device 1 is equipped with a back-up electrical power supply 49A such as a battery which, in the event of a power failure, makes it possible to ensure the continuity of operation of the device 1 by supplying the necessary electrical energy to the measurement means 9 and to the processing unit 11.

In order to inform a user as to the state or the tank 3 and as to the state of operation of the device 1, the processing unit 11 comprises on the one hand various means for checking the state of operation of the units and means of the device 1 and on the other hand a unit 49 for displaying particular information, especially information received from the restocking centre 42 and information read off by the checking means and by the measurement means 9. This display unit 49 is controlled by part of the central processing unit 30.

As regards the state checking means, the device comprises more particularly means 30A for checking the state of operation of the central processing unit 30, means 40A for checking the state of operation of the communication means 40, means 49B for checking the state of operation of the back-up electrical power supply 49A, means 10B for checking the state of operation of the calibration unit 10A. By ensuring the validity of the signals output by the sensor 10, the central processing unit 30 additionally constitutes a means for checking the state of operation of the sensor 10. With a view to displaying the information read off on the display unit 49, the checking means 10B, 30A, 40A and 49B are each linked to the central processing unit 30.

The unit 49 is preferably a liquid crystal display equipped with a back-lit screen which adapts automatically to the brightness of the environment in which the screen is located. A liquid crystal display has the advantage that it can operate within a wide range of temperatures and even under difficult weather conditions, and therefore it can be installed together with the device outdoors.

Figure 2:
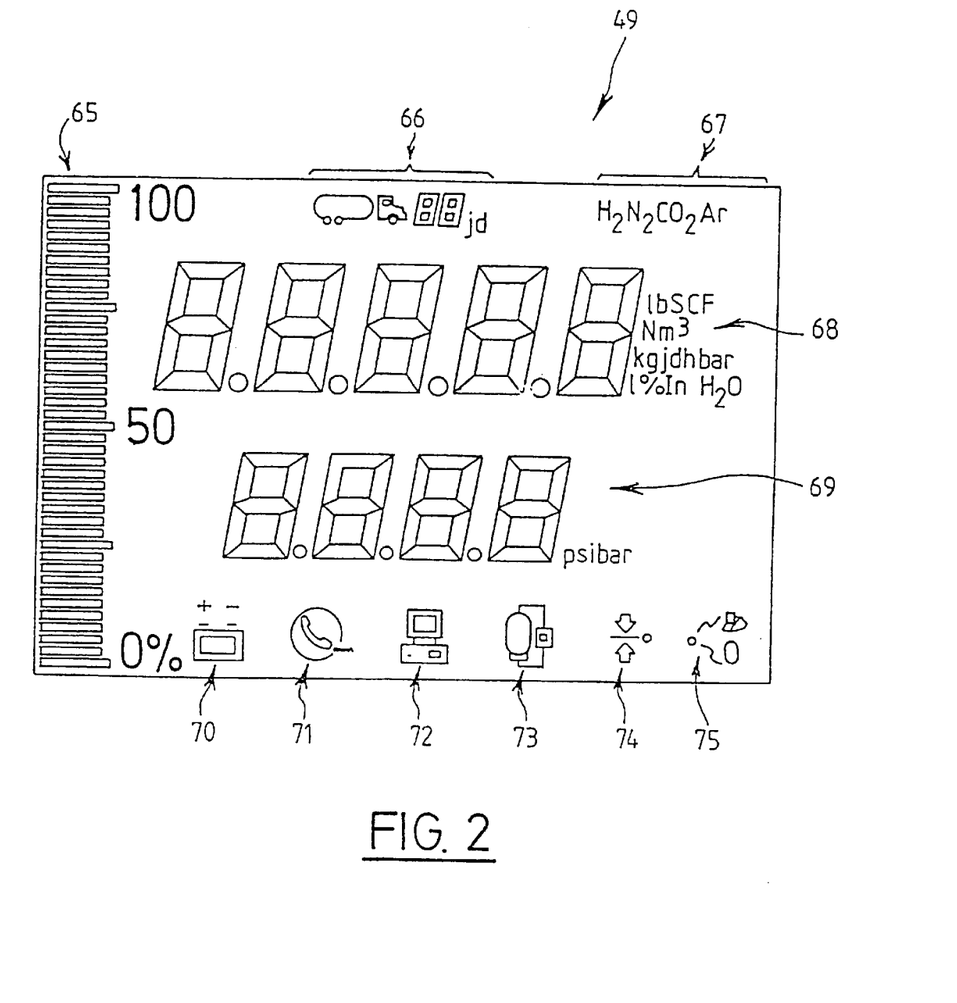
FIG. 2 is an illustrative embodiment of a screen of a display unit of the device according to the invention.

FIG. 2 shows an illustrative embodiment of the screen layout of such a display unit 49.

The screen of the display unit 49 is subdivided into various areas 65 to 75 each displaying, depending on the commands received from the central processing unit 30, a single item of information. Because identical information is always displayed at the same location on this screen, the customer can quickly identify the state of the tank 3 and the state of operation of the device itself.

The various display areas of the unit 49 as well as the information displayed therein will be described in detail below.

Located in the left-hand part of the screen is an area 65 for displaying the storage level of product contained in the tank 3. This level display area 65 is produced in the form of a percentage incremental display from 0 to 100% of the degree of fill of the tank 3 extending over the entire height of the screen. This area 65 is continually in operation and the value displayed is refreshed after each measurement of the storage level.

Arranged in the upper central part of the screen is an area 68 for the digital display of either the product storage level in a unit defined in advance such as lb, SCF, $Nm^3$, kg etc., or of the reserve of the tank 3. The reserve of the tank 3 is understood to mean the estimated duration in hours or in days until the stock of product is exhausted. This duration is calculated by the central processing unit 30 on the basis of the consumption figures recorded in the memory 31.

In the lower central part of the unit 49 there is an area 69 for displaying the absolute pressure existing in the tank 3, this in a unit predefined in advance.

Above the area 68, in the right-hand part of the screen, there is an area 67 for permanently displaying the type of product, for example $H_2$, $N_2$, $CO_2$ or Ar, stored in the tank 3.

Located above the area 68 and between the areas 65 and 67 is an area 66 for displaying a message signaling the receipt of an acknowledgement of receipt. This display comprises two parts, a first showing a picture of a restocking truck and a second for displaying a delivery deadline in days. Thus, after having received the restocking command sent by the device 1, the restocking centre 42 sends to the device an acknowledgement of receipt to signal the recording of this command, and an estimated or actual delivery deadline. Thus, the customer is able to make all the necessary arrangements for the delivery, for example shutting down the installations fed from the tank.

Arranged side by side beneath the area 69, to the right of the area 65, are areas 70 to 75 for displaying information read off by the checking means 10B, 30, 30A, 40A and 49B.

The area 70 displays the picture of a battery when the device has detected a power failure and operates with the aid of the electricity provided by the battery. Provision is moreover made for the picture of the battery in the area 70 to flash if the checking means 49B have detected that the electrical energy stored up in the battery 49A is almost exhausted.

Represented in the area 71 is a picture showing, inside a circle, a telephone handset. This picture is displayed by the screen when the communication means 40 are transferring or receiving information respectively to or from the restocking centre 42. Moreover, there is a further provision for displaying this picture in slow flashing mode and another in rapid flashing mode. The slow flashing mode is triggered when the transmission means 44 have received, from the means 38, a command to transmit a warning signal to the restocking centre 42, but cannot establish a communication link with the latter. The rapid flashing mode is triggered when the means 40A for checking the communication means 40 have detected a fault in the communication means 40.

Represented in the zone 72 is a picture showing a computer. This picture is displayed continuously if the means 30A have read out correct operation of the central processing unit 30. When the unit 30 is being initialized, for example following a command received from the restocking centre 42, this picture flashes slowly. In the event that the checking means 30A have discerned that an error has occurred in the operation of the unit 30, the picture flashes rapidly.

Represented in the zone 73 is the picture symbolizing the tank 3 equipped with the measurement sensor 10. When the screen displays this picture continuously, the central processing unit 30, which checks the signals output by the sensor 10 from a validity point of view, deems that the latter is operating normally. If the sensor outputs inconsistent signals which are therefore invalid, this picture is displayed in a slow flashing mode. By contrast, if the sensor outputs no signals at all, this picture is displayed in a rapid flashing mode showing the customer that the sensor is faulty.

Represented in the display area 74 is a picture showing two opposing arrows pointing towards a line marking a "zero" reference. This picture is displayed continuously when the unit 10A is calibrating the "zero" reference of the sensor 10. If this calibration has to be redone, this picture is displayed in a slowly flashing mode. If the calibration unit 10A is faulty, this picture is displayed in a rapidly flashing mode.

Moreover, there is provision to link the device according to the invention to other monitoring terminals. To this end, when the device is transmitting information towards an additional terminal of this kind, the picture in the area 75 showing a dot linked on the one hand to a terminal and on the other hand to a tank, is displayed.

Advantageously, the processing unit 11 for processing the signals output by the sensor 10 is embodied in the form of a computer loaded with a suitable program and equipped with a card for the analog/digital conversion of the signals from the sensor 10 and with a modem for transmitting and receiving, for example via a telephone network, information respectively to or from the restocking centre 42.

The sensor 10 measures on the one hand the absolute pressure P existing in the tank and on the other hand the differential pressure $DP_c$ between the two capillaries 17 and 19 to which it is linked. This differential pressure $DP_c$ is related to the pressures $P_T^+$ at the high point 13 and $P_T^-$ at the low point 15 of the tank by the following relation:

$$P_T^+ - P_T^- = DP_c + \frac{P}{P_0}\rho_{v0} gH$$

where $\rho_{v0}$ is the density of the gas at a given absolute pressure $P_0$,
g is the acceleration due to gravity, and
H is the height of the tank 3 between the high point 13 and low point 15.

The pressure difference $(P_T^+ - P_T^-)$ represents the weight per unit area of a column comprising both phases, the liquid phase 7 and the gaseous phase 5, of the liquefied gas 4 in the tank 3. It is therefore directly proportional to the total quantity of the product contained in the tank 3. This quantity, that is to say the storage level of the product in the tank, is obtained for example via a calibration curve established in advance and which takes into account the variation in the cross-section of the tank in the direction of its height, especially in the dome part and the bottom part of the tank 3.

In this regard, reference may be made to the document FR-A-2554230 in the name of the Applicant.

In another embodiment, which is more suited to a tank for storing a liquid at ambient temperature, there is provision to equip this storage tank with a flow rate meter which measures, quasi-continuously, the quantity of product drawn off from the tank. In order to measure the quantity of product consumed between two successive instants, the quantities of product drawn off from the tank between two successive instants are integrated. In the event that the total quantity $N_{tot}$ of product which can be stored in the tank is known and recorded in the processing unit 11, there is provision to deduce the storage level of the product in the tank from this quantity $N_{tot}$ and the quantities of product drawn off from the tank.

The operation of the device represented in FIG. 1 together with the process for generating at least one warning signal according to the invention will be explained below with regard to FIGS. 3 and 4.

Figure 3:
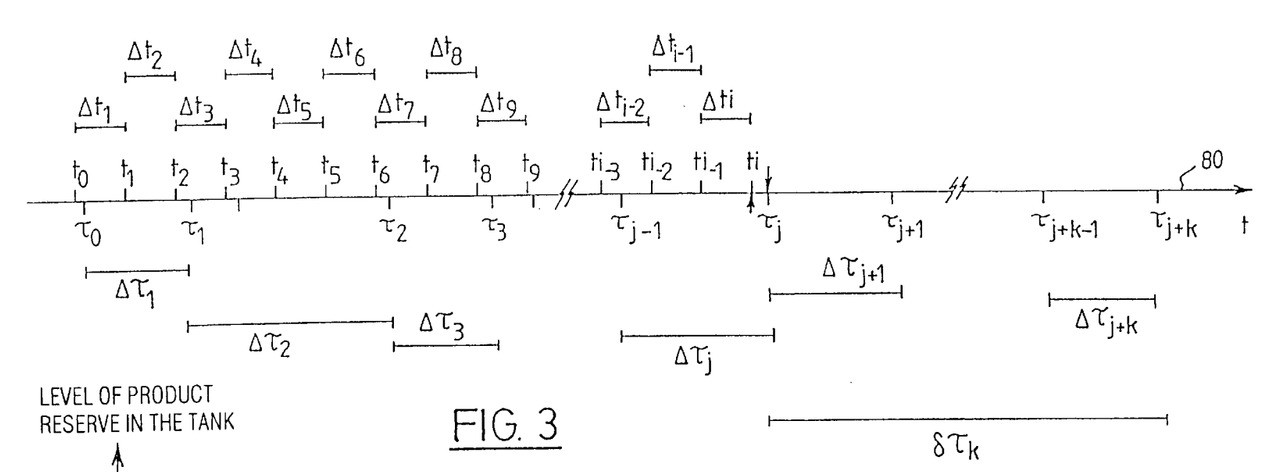
FIG. 3 is a timescale showing important instants in the running of the process according to the invention.

Represented in FIG. 3 is a timescale 80. Successive instants $t_0, t_1 \ldots t_{i-1}, t_i$ (i being any natural number) are indicated on this timescale. These instants are output by the clock 32 of the device according to the invention. At these successive instants $t_n$ which are spaced apart by equal time intervals $\Delta t_n$ (n being a natural number lying between 0 and i), $\Delta t_1 = t_1 - t_0, \Delta t_2 = t_2 - t_1, \ldots \Delta t_{i-1} = \Delta t_{i-1} - \Delta t_{i-2}, \Delta t_i = t_i - t_{i-1}$, the central processing unit 30 determines the values $N_0, N_1, \ldots N_{i-1}, N_i$ of the storage level of the product in the tank 3 from the signals output by the differential pressure sensor 10 according to the manner described above. Moreover, the unit 30 also calculates the values of the quantity of product $\Delta N_1, \Delta N_2, \ldots, \Delta N_{i-1}, \Delta N_i$ consumed during the time intervals $\Delta t_n$. On this scale 80, $t_i$ is the most recent measurement instant.

The duration of the time intervals $\Delta t_n$ is chosen as a function of the size of the tank 3 and of the product quantities drawn off by consumer installations connected downstream of the tank. This is because the duration of the time interval must on the one hand be short enough to be able to follow the movements in the storage level of product in the tank, and on the other hand long enough for the variation in the storage level to be capable of being reliably measured by the sensor 10. Independently of these considerations, the Applicant has found that a duration of the time intervals $\Delta t_n$ of less than 2 hours, preferably equal to one hour and typically equal to thirty minutes, is suitable for most storage tanks.

Figure 4:
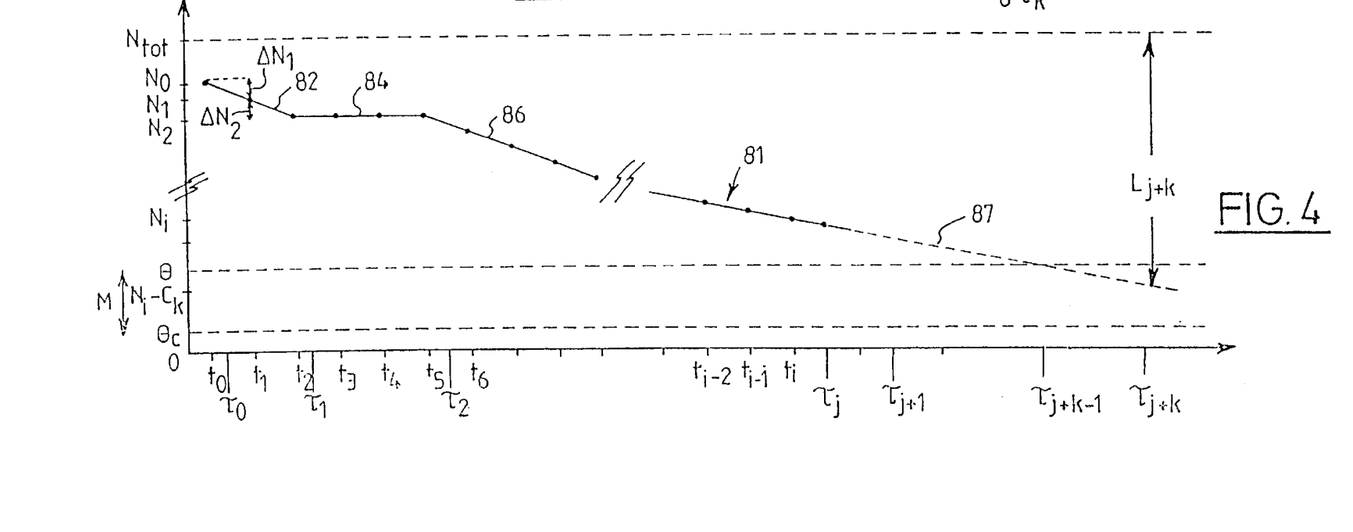
FIG. 4 is a chart showing an example of a curve of consumption versus time for a tank to which the process according to the invention is applied.

An example of a set of measurements of product storage level versus time has been represented on a graph in FIG. 4. The abscissa which represents the timescale is also marked with the measurement instants $t_n$. To guide the eye, the measurement points, that is to say the levels $N_n$ measured at the associated instants $t_n$, are joined by straight line segments forming a curve 81. In addition to the levels $N_n$ measured at the instants $t_n$, the total quantity $N_{tot}$ of product which can be stored in the tank, and two thresholds $\theta$ and $\theta_c$ held in the memory means 36 and which serve respectively for generating a warning signal according to the process of the invention have been represented along the ordinate which represents the scale for the storage level of product in the tank.

Various types of consumption are differentiated on the curve 81. For example, on a first portion 82 of the curve 81 between the instants $t_0$ and $t_2$, the quantity $\Delta N_1 + \Delta N_2$ of product is consumed. Next, between $t_2$ and $t_5$, on portion 84 of the curve, the storage level of the product remains constant. Such a situation corresponds in particular to the shutting down of the installation connected downstream of the tank, which may be the case for example during a technical incident or during a non-working day, such as for example the weekend. Next, over the following portion 86 of the curve, product consumption resumes.

In accordance with the process according to the invention, the values $N_n$ of level, the corresponding instants $t_n$ and the product quantities $\Delta N_n$ consumed during the time intervals $\Delta t_n$ are held in the memory 31 of the unit 11.

Advantageously, only a predefined number of values $N_n$, $t_n$ and $\Delta N_n$ is held in the memory 31 of the unit 11, and the central processing unit 30 replaces the oldest values with the most recent values once this predefined number is reached. Thus, the estimates and calculations by the central processing unit 30 are always carried out on a constantly updated database which best reflects the trend in consumption of the product for the tank in question.

Successive instants $\tau_0, \tau_1, \ldots \tau_{j-1}, \tau_j, \tau_{j+1}, \ldots \tau_{j+k-1}$ and $\tau_{j+k}$ (j and k being any natural numbers) are also represented on the timescale 80 of FIG. 3 as well as along the abscissa of the graph of FIG. 4, these instants including $\tau_j$ which is the most recent instant and $\tau_{j+1}, \ldots \tau_{j+k-1}$ and $\tau_{j+k}$ which are future instants. These instants are sent to the central processing unit 30 by the clock 32 and are respectively spaced apart by predefined time intervals $\Delta\tau_1 = \tau_0 - \tau_1, \Delta\tau_2 = \tau_2 - \tau_1, \ldots \Delta\tau_j = \tau_j - \tau_{j-1}$ etc. $\tau_{j+k}$ is the $k^{th}$ instant following $\tau_j$ and spaced apart therefrom by the time interval $\delta\tau_k = \Delta\tau_{j+1} + \Delta\tau_{j+2} + \ldots + \Delta\tau_{j+k}$.

The instants $\tau_i$ (i being a natural number lying between 0 and j+k) correspond to a given moment of a working day, for example to 0h15, when the central processing unit 30 carries out a projection of future consumption and storage levels on the basis of the values held in the memory 31. In this context, the expression "working day" means a day on which the restocking centre 42 can deliver a quantity of product so as to restock the tank 3, for example from Monday to Friday. On the other hand, a "non-working day" corresponds to a day on which the restocking centre 42 cannot deliver, for example weekends or public holidays. It is therefore understood that the successive instants $\tau_i$ are spaced apart by time intervals $\Delta\tau_i$ whose duration varies depending on whether or not there is for example a public holiday between two successive instants $\tau_i$.

The duration of the time intervals $\Delta\tau_i$ is chosen to be greater than or equal to the time intervals $\Delta\tau_n$. Advantageously, the time interval $\Delta\tau_i$ is a multiple on the one hand of the time intervals $\Delta\tau_n$ and on the other hand of 24 hours.

The duration of the time interval $\delta\tau_k$ corresponds go a delivery deadline of the restocking centre 42. This duration is for example three working days and corresponds to the time which the supplier needs in order to schedule the rounds of his pool of restocking vehicles.

At the instants $\tau_i$, the central processing unit 30 calculates, firstly, on the basis of the values held in memory of the product quantity $\Delta N_n$ consumed during the time intervals $\Delta t_n$, a value of the estimated quantity of product $C_k$ which will be consumed between the instant $\tau_j$ and the instant $\tau_{j+k}$.

$C_k$ is calculated for example by determining, from among all the values held in memory, the product consumption figures over periods of a duration $\delta\tau_k$ and by calculating the average of these consumptions. Of course, in this calculation of $C_k$, the unit 30 takes into account whether the period $\delta\tau_k$ includes days on which the consumer installations connected downstream of the tank are non-operational.

Secondly, the central processing unit 30 subtracts this value $C_k$ from the last value measured $N_i$ to obtain an estimated value $N_i - C_k$ of the storage level at the instant $\tau_{j+k}$. This estimated value is represented on the graph of FIG. 4 and is joined to the value $N_i$ measured at the instant $t_i$ by a dashed line 87.

Next, it outputs this estimated value $N_i - C_k$ to the comparison means 34 which compare this estimated value $N_i - C_k$ of the storage level with the preset threshold $\theta$. If the estimated value $N_i - C_k$ is less than the threshold $\theta$, the comparison means 34 send a command signal to the means 38 which generate a warning signal. This warning signal is transmitted to the restocking centre 42 via transmission means 44. In this case, the restocking centre 42 is warned that the tank 3 should be restocked within a deadline $\delta\tau_k$.

Advantageously, the threshold $\theta$ is made up of a critical stock depletion threshold $\theta_c$ and a margin M as represented in FIG. 3. The critical threshold $\theta_c$ corresponds for example to typical daily consumption. Once the level has dropped below this threshold, there is then a risk of a depletion of stock within that day. This is why, for greater safety, the warning generating means 38 generate an emergency warning signal if the estimated value $N_i - C_1$ is less than or equal to this critical threshold $\theta_c$, $C_1$ being the estimated quantity of product consumed between two successive instants $\tau_i$, that is to say during a time interval $\Delta\tau_1 = \Delta\tau_{j+1}$. This emergency signal is transmitted immediately by the means 44 to the restocking centre 42 so as to inform it that the tank should be restocked as quickly as possible. However, an emergency case of this kind can occur only if the instants $\tau_1$ are chosen so as to be spaced too far apart, or if a very high consumption of product has occurred unexpectedly.

The margin M is determined through statistical treatment of the values $\Delta N_n$ held in memory. In this statistical treatment, the margin M is chosen in such a way that the probability of the storage level dropping below $\theta_c$ at the instant $\tau_{j+k-1}$ is almost equal to zero.

The receiving of a warning signal by the restocking centre 42 is equivalent to a delivery order from the customer on whose premises the tank 3 is installed. To inform the customer that the warning signal has indeed been received, and that a delivery order has been recorded, the restocking centre 42 sends an acknowledgement of receipt signal which is received by the reception means 46 of the device 1, and which is displayed on the display unit 49.

In the case in which the warning generating means 38 generate a warning signal, the central processing unit 30 also calculates at the instant $\tau_j$ an estimate of the quantity $L_{j+k}$ of product which can be placed in the tank during a restocking of the latter at the instant $\tau_{j+k}$. This estimated quantity is calculated according to the following relation:

$$L_{j+k} = N_{tot} - (N_i - C_k)$$

Together with the warning signal, a signal corresponding to this quantity $L_{j+k}$ as well as a signal corresponding to the instant $\tau_{j+k}$ are transmitted by the transmission means 44 to the restocking centre 42. Thus, the supplier is not only informed that a tank needs to be restocked, but also of the quantity of product which he may deliver at an instant $\tau_{j+k}$.

Consequently, he is in possession of all the information required for optimal scheduling of the rounds of his restocking vehicles and for maximizing the quantity to be delivered during each delivery trio. The process and the device for the implementation thereof therefore make it possible to set warning thresholds which are appreciably lower than the warning thresholds of the known devices previously described, and considerably reduce the cost of product distribution.

The values held in memory $N_n$, $\Delta N_n$ and $t_n$ form a database. Advantageously, in order to account for very different trends in consumption, for example consumption related to seasonal activities, a suitable database of values $N_n$, $\Delta N_n$ and $t_n$, held in the memory 30 of the processing unit 11, is built for each mode of operation. Depending on an order which is sent for example by the restocking centre 42, the central processing unit 30 takes into account the database associated with the characteristic period in progress in order to calculate the values of the estimated quantities of product.

What is claimed is:

1. Process for generating at least one warning signal relating to the level in a tank (3) for storing a product (4) with a view to the restocking of the tank (3), in which at least one measurement sensor (10) associated with the tank (3) is used to determine, at successive instants $t_0$, $t_1$ ... $t_{i-1}$, $t_i$ respectively, the values $N_0$, $N_1$ ... $N_{i-1}$, $N_i$ of the level of storage of the product in the tank (3), together with the values of the quantity of product $\Delta N_1$, $\Delta N_2$, ... $\Delta N_{i-1}$, $\Delta N_i$ consumed during the time intervals defined by two successive instants $\Delta t_1 = t_1 - t_0$, $\Delta t_2 = t_2 - t_1$, ... $\Delta t_{i-1} = t_{i-1} - t_{i-2}$, $\Delta t_i = t_i - t_{i-1}$, comprising the following steps:

the measured values $N_0$, $N_1$, ... $N_{i-1}$, $N_i$, together with $\Delta N_1$, $\Delta N_2$, ... $\Delta N_{i-1}$, $\Delta N_i$ and the associated measurement instants $t_0$, $t_1$ ... $t_{i-1}$, $t_i$ are placed in memory, at successive instants $\tau_0$, $\tau_1$ ... $\tau_{j-1}$, $\tau_j$ which are spaced apart by time intervals $\Delta\tau_1 = \tau_1 - \tau_0$, $\Delta\tau_2 = \tau_2 - \tau_1$, ... $\Delta\tau_j = \tau_j - \tau_{j-1}$ respectively, the time intervals $\Delta\tau$ being predefined and their duration being greater than or equal to the time intervals $\Delta t_n$, n being any natural number lying between 0 and i, the values placed in memory of the product quantity consumed $\Delta N_n$ during the time intervals $\Delta t_n$ are used to calculate a value of the estimated quantity of product $C_k$ which will be consumed between the instant $\tau_j$ and the instant $\tau_{j+k}$, $\tau_{j+k}$ being the k-th instant following $\tau_j$ and spaced apart therefrom by the time interval $\delta\tau_k = \Delta\tau_{j+1} + \Delta\tau_{j+2} + \ldots + \Delta\tau_{j+k}$, this value $C_k$ is subtracted from the most recent measured value $N_i$ so as to obtain an estimated value $N_i-C_k$ of the storage level at the instant $\tau_{j+k}$, this estimated value $N_i-C_k$ of the storage level is compared with a preset threshold $\theta$, and a warning signal is generated if the estimated value $N_i-C_k$ is less than the preset threshold $\theta$.

2. Process according to claim 1, characterized in that the values of the product quantity $\Delta N_n$ consumed during the time interval $\Delta t_n$ are determined by subtracting the value $N_n$ of the storage level measured at the instant $t_n$ from the value $N_{n-1}$ of the storage level measured at the instant $t_{n-1}$.

3. Process according to claim 1, characterized in that the value of the product quantity $\Delta N_n$ consumed during the time interval $\Delta t_n$ is determined by measuring by means of a second sensor the flow rate of product drawn off from the tank and by integrating this measured flow rate between the instants $t_{n-1}$ and $t_n$.

4. Process according to claim 1, characterized in that all the intervals $\Delta t_n$ are equal.

5. Process according to claim 1, characterized in that the duration of the time intervals $\Delta t_n$ is less than two hours, preferably less than one hour and especially equal to 30 minutes.

6. Process according to claim 1, characterized in that the time intervals $\Delta \tau_i$ are multiples of the time intervals $\Delta t_n$ and preferably, $\Delta \tau_i$ is moreover equal to twenty-four hours or a multiple or twenty-four hours, i being any natural number lying between 0 and j+k.

7. Process according to claim 1, characterized in that each instant $\tau_i$ corresponds to a given moment of a working day of a centre (42) for restocking the tank (3).

8. Process according to claim 1, characterized in that the total quantity of product $N_{tot}$ which can be stored in the said tank (3) is placed in memory, and in that an estimate of the quantity of product $L_{j+k}=N_{tot}-(N_i-C_k)$ which can be placed in the tank (3) during a restocking of the latter at the instant $\tau_{j+k}$ is moreover calculated at the instants $\tau_i$.

9. Process according to claim 1, characterized in that the duration of the time intervals $\delta\tau_k$ corresponds to a predefined delivery deadline.

10. Process according to claim 1, characterized in that the threshold $\theta$ is made up of a critical stock depletion threshold $\theta_c$ and a margin M, the margin M being chosen in such a way that the probability of the storage level dropping below $\theta_c$ at the instant $\tau_{j+k-1}$ is almost equal to zero.

11. Process according to claim 10, characterized in that an emergency warning signal is generated if the estimated value $N_i-C_1$ is less than or equal to the critical threshold $\theta_c$, $C_1$ being the estimated quantity of consumption between two successive instants $\tau_i$.

12. Process according claim 8, characterized in that a warning signal is transmitted to a restocking centre (42) which is remote from the storage tank (3).

13. Process according to claim 12, characterized in that a signal corresponding to the estimated quantity of product $L_{j+k}$, which can be placed in the tank during a restocking of the tank (3) at the instant $\tau_{j+k}$ is transmitted together with the warning signal.

14. Process according to claim 12, characterized in that a signal corresponding to the instant $\tau_{j+k}$ at which the product storage level runs the risk of being less than the preset threshold $\theta$ is transmitted together with the warning signal.

15. Process according to claim 12, characterized in that a signal acknowledging receipt of the warning signal is transmitted from the restocking centre (42).

16. A device for generating at least one warning signal, the device comprising:

a measuring means for measuring storage level information $N_n$ of a product in a tank;

a clock for generating measurement times $t_n$;

a central processing unit for utilizing the storage level information $N_n$ measured by said measuring means and for computing a value $C_k$ of the estimated quantity of the product which will be consumed during a future time interval $\Delta\tau_k$;

a memory unit connected to said central processing unit for holding the measurement times $t_n$ output by said clock, storage level information $N_n$ corresponding to the measurement times $t_n$, and product quantities $\Delta N_n$ consumed during the time interval $\Delta t_n$;

a means for placing at least one storage level threshold $\theta$ into another memory unit;

a comparison means for comparing the projected value of the storage level $N_i-C_k$ at a future time $\tau_{j+k}$ with the at least one storage level threshold $\theta$;

a warning generation means controlled by said comparison means for generating a warning signal; and a transmission means linked to said central processing unit for transmission to a restocking center a signal corresponding to the value $L_{j+k}$ of the quantity of the product which can be placed in the tank during a restocking at the future time $\tau_{j+k}$ and for transmission of a signal corresponding to the future time $\tau_{j+k}$.

17. The device according to claim 16, wherein said transmission means is controlled by said warning generation means.

18. The device according to claim 16, wherein said measuring means comprises a sensor for measuring a differential pressure between two capillaries, wherein a first of said two capillaries is linked to a high point of the tank, and a second of said two capillaries is linked to a low point of the tank.

19. The device according to claim 16, further comprising a display unit for displaying the type of product contained in the tank and the storage level information $N_n$ of the storage level of the product.

20. A device according to claim 18 further comprising a means for receiving information sent by a restocking center.

21. The device according to claim 20, further comprising a display unit for displaying an acknowledgment of receipt by the restocking center of the warning signal generated by said warning generation means.

22. The device according to claim 16, further comprising a display unit for displaying an acknowledgment of receipt by the restocking center of the warning signal from the device.

23. A tank level storage indication and prediction system, the system comprising:

a tank for storing a product;

a measuring means for measuring storage level information $N_n$ of a product in a tank;

a clock for generating measurement times $t_n$;

a central processing unit for utilizing the storage level information $N_n$ measured by said measuring means and for computing a value $C_k$ of the estimated quantity of the product which will be consumed during a future time interval $\Delta\tau_k$;

a memory unit connected to said central processing unit for holding the measurement times $t_n$ output by said clock, storage level information $N_n$ corresponding to the measurement times $t_n$, and product quantities $\Delta N_n$ consumed during the time interval $\Delta t_n$;

a means for placing at least one storage level threshold $\theta$ into another memory unit;

a comparison means for comparing the projected value of the storage level $N_i-C_k$ at a future time $\tau_{j+k}$ with the at least one storage level threshold $\theta$;

a warning generation means controlled by said comparison means for generating a warning signal; and a transmission means linked to said central processing unit for transmission to a restocking center a signal corresponding to the value $L_{j+k}$ of the quantity of the product which can be placed in the tank during a restocking at the future time $\tau_{j+k}$ and for transmission of a signal corresponding to the future time $\tau_{j+k}$;

a means for receiving information sent by a restocking center; and a display unit for displaying an acknowledgment of receipt by the restocking center of the warning signal generated by said warning generation means.

* * * * *